(12) United States Patent
Natanzon et al.

(10) Patent No.: US 8,041,940 B1
(45) Date of Patent: Oct. 18, 2011

(54) OFFLOADING ENCRYPTION PROCESSING IN A STORAGE AREA NETWORK

(75) Inventors: Assaf Natanzon, Ramat-Gan (IL); Shlomo Ahal, Tel-Aviv (IL)

(73) Assignee: EMC Corporation, Hopkinton, MA (US)

( * ) Notice: Subject to any disclaimer, the term of this patent is extended or adjusted under 35 U.S.C. 154(b) by 925 days.

(21) Appl. No.: 11/964,228

(22) Filed: Dec. 26, 2007

(51) Int. Cl.
*H04L 29/06* (2006.01)

(52) U.S. Cl. ........ 713/153; 713/150; 713/152; 713/160; 713/189; 713/151; 380/287; 370/389; 718/100; 718/105; 726/13; 726/14; 726/11; 726/12; 709/201; 709/229

(58) Field of Classification Search .................. 713/189, 713/168
See application file for complete search history.

(56) References Cited

U.S. PATENT DOCUMENTS

| | | | |
|---|---|---|---|
| 5,170,480 A | 12/1992 | Mohan et al. |
| 5,388,254 A | 2/1995 | Betz et al. |
| 5,499,367 A | 3/1996 | Bamford et al. |
| 5,864,837 A | 1/1999 | Maimone |
| 5,879,459 A | 3/1999 | Gadgil et al. |
| 5,990,899 A | 11/1999 | Whitten |
| 6,042,652 A | 3/2000 | Hyun et al. |
| 6,065,018 A | 5/2000 | Beier et al. |
| 6,143,659 A | 11/2000 | Leem |
| 6,148,340 A | 11/2000 | Bittinger et al. |
| 6,174,377 B1 | 1/2001 | Doering et al. |
| 6,174,809 B1 | 1/2001 | Kang et al. |
| 6,203,613 B1 | 3/2001 | Gates et al. |
| 6,260,125 B1 | 7/2001 | McDowell |
| 6,270,572 B1 | 8/2001 | Kim et al. |
| 6,272,534 B1 | 8/2001 | Guha |
| 6,287,965 B1 | 9/2001 | Kang et al. |
| 6,314,447 B1 * | 11/2001 | Lea et al. ...................... 718/105 |
| 6,467,023 B1 | 10/2002 | DeKoning et al. |
| 6,574,657 B1 | 6/2003 | Dickinson |
| 6,621,493 B1 | 9/2003 | Whitten |
| 6,804,676 B1 | 10/2004 | Bains, II |
| 6,947,981 B2 | 9/2005 | Lubbers et al. |
| 7,043,610 B2 | 5/2006 | Horn et al. |
| 7,076,620 B2 | 7/2006 | Takeda et al. |
| 7,111,197 B2 | 9/2006 | Kingsbury et al. |
| 7,117,327 B2 | 10/2006 | Hirakawa et al. |
| 7,120,768 B2 | 10/2006 | Mizuno et al. |
| 7,130,975 B2 | 10/2006 | Suishu et al. |

(Continued)

FOREIGN PATENT DOCUMENTS

EP    1154356    11/2001

(Continued)

OTHER PUBLICATIONS

Microsoft Computer Dictionary, 2002 Press Fifth Edition, p. 58.

(Continued)

*Primary Examiner* — Nathan Flynn
*Assistant Examiner* — Bryan Wright
(74) *Attorney, Agent, or Firm* — Daly, Crowley, Mofford & Durkee, LLP

(57) ABSTRACT

In one aspect, a method to offload encryption processing in a storage area network (SAN) system includes determining whether a host is performing at a first performance level, offloading encryption processing at a processor if the host is not performing at a first performance level and performing encryption processing at the host if the host is performing at a first performance level.

16 Claims, 7 Drawing Sheets

U.S. PATENT DOCUMENTS

| | | |
|---|---|---|
| 7,139,927 B2 | 11/2006 | Park et al. |
| 7,159,088 B2 | 1/2007 | Hirakawa et al. |
| 7,167,963 B2 | 1/2007 | Hirakawa et al. |
| 7,222,136 B1 | 5/2007 | Brown et al. |
| 7,296,008 B2 | 11/2007 | Passerini et al. |
| 7,328,373 B2 | 2/2008 | Kawamura et al. |
| 7,360,113 B2 | 4/2008 | Anderson et al. |
| 7,415,723 B2 * | 8/2008 | Pandya ............................ 726/13 |
| 7,426,618 B2 | 9/2008 | Vu et al. |
| 7,516,287 B2 | 4/2009 | Ahal et al. |
| 7,519,625 B2 | 4/2009 | Honami et al. |
| 7,519,628 B1 | 4/2009 | Leverett |
| 7,546,485 B2 | 6/2009 | Cochran et al. |
| 7,577,867 B2 | 8/2009 | Lewin et al. |
| 7,606,940 B2 | 10/2009 | Yamagami |
| 7,627,612 B2 | 12/2009 | Ahal et al. |
| 7,627,687 B2 | 12/2009 | Ahal et al. |
| 7,757,057 B2 | 7/2010 | Sangapu et al. |
| 2002/0129168 A1 | 9/2002 | Kanai et al. |
| 2003/0061537 A1 | 3/2003 | Cha et al. |
| 2003/0110278 A1 | 6/2003 | Anderson |
| 2003/0196147 A1 | 10/2003 | Hirata et al. |
| 2004/0117614 A1 * | 6/2004 | Minnick et al. ............... 713/160 |
| 2004/0205092 A1 | 10/2004 | Longo et al. |
| 2004/0250032 A1 | 12/2004 | Ji et al. |
| 2004/0254964 A1 | 12/2004 | Kodama et al. |
| 2005/0015663 A1 | 1/2005 | Armangau et al. |
| 2005/0028022 A1 | 2/2005 | Amano |
| 2005/0049924 A1 | 3/2005 | DeBettencourt et al. |
| 2005/0172092 A1 | 8/2005 | Lam et al. |
| 2005/0273655 A1 | 12/2005 | Chow et al. |
| 2006/0031647 A1 | 2/2006 | Hirakawa et al. |
| 2006/0047996 A1 | 3/2006 | Anderson et al. |
| 2006/0064416 A1 | 3/2006 | Sim-Tang |
| 2006/0107007 A1 | 5/2006 | Hirakawa et al. |
| 2006/0117211 A1 | 6/2006 | Matsunami et al. |
| 2006/0161810 A1 | 7/2006 | Bao |
| 2006/0195670 A1 | 8/2006 | Iwamura et al. |
| 2006/0212462 A1 | 9/2006 | Heller et al. |
| 2007/0055833 A1 | 3/2007 | Vu et al. |
| 2007/0162513 A1 | 7/2007 | Lewin et al. |
| 2007/0180304 A1 | 8/2007 | Kano |
| 2007/0198602 A1 | 8/2007 | Ngo et al. |
| 2007/0198791 A1 | 8/2007 | Iwamura et al. |
| 2007/0220311 A1 | 9/2007 | Lewin et al. |
| 2007/0266053 A1 | 11/2007 | Ahal et al. |
| 2008/0082591 A1 | 4/2008 | Ahal et al. |
| 2008/0082592 A1 | 4/2008 | Ahal et al. |
| 2008/0082770 A1 | 4/2008 | Ahal et al. |
| 2009/0089351 A1 * | 4/2009 | Belgaied et al. ............... 709/201 |

FOREIGN PATENT DOCUMENTS

| | | | |
|---|---|---|---|
| WO | WO 00 45581 A3 | 8/2000 | |

OTHER PUBLICATIONS

Gibson; "Five Point Plan Lies at the Heart of Compression Technology", Apr. 29, 1991, p. 1.

Soules et al.; "Metadata Efficiency in Versioning File Systems", 2003, pp. 1-16.

Soules et al.; "Metadata Efficiency in a Comprehensive Versioning File System", May 2002, CMU-CS-02-145, School of Computer Science, Carnegie Mellon University, Pittsburgh, PA 15213, 33 pages.

AIX System Management Concepts: Operating Systems and Devices May 2000, pp. 1-280.

Notice of Allowance dated Oct. 5, 2010, U.S. Appl. No. 11/964,198, 93 pages.

U.S. Appl. No. 60/752,665, filed Dec. 21, 2005, file downloaded Aug. 20, 2010, 61 pages.

U.S. Appl. No. 11/609,560, filed Dec. 12, 2006, file downloaded Aug. 20, 2010, 265 pages.

U.S. Appl. No. 60/753,263, filed Dec. 22, 2005, file downloaded Aug. 20, 2010, 82 pages.

U.S. Appl. No. 11/356,920, filed Dec. 17, 2006, file downloaded Aug. 20, 2010, 240 pages.

U.S. Appl. No. 10/512,687, filed Aug. 24, 2005, file downloaded Sep. 2, 2010, 377 pages.

U.S. Appl. No. 11/536,233, filed Sep. 28, 2006, file downloaded Aug. 20, 2010, 256 pages.

U.S. Appl. No. 11/536,215, filed Sep. 28, 2006, file downloaded Aug. 20, 2010, 167 pages.

U.S. Appl. No. 11/536,160, filed Sep. 28, 2006, file downloaded Aug. 20, 2010, 230 pages.

Notice of Allowance dated Oct. 5, 2010 for U.S. Appl. No. 11/964,198, filed Dec. 26, 2007, 8 pages.

Linux Filesystems, Sams Publishing, 2002, pp. 17-22 and 67-71.

Bunyan, Multiplexing in a BrightStor® ARCserve® Backup Release 11, Mar. 2004, pp. 1-4.

Marks, "Network Computing", Feb. 2, 2006, pp. 1-9.

Hill, Network Computing, Jun. 8, 2006, pp. 1-9.

Issue Fee transmittal (PTOL-085B, Part B) with Comments on Statement for Reasons for Allowance dated Oct. 12, 2010 for U.S. Appl. No. 11/964,198, filed Dec. 26, 2007, 2 pages.

* cited by examiner

OFFLOADING ENCRYPTION PROCESSING IN A STORAGE AREA NETWORK

BACKGROUND

Referring to FIG. 1, a conventional storage area network (SAN) 10 includes one or more hosts (e.g., a host 12) connected to one or more storage arrays (e.g., a storage array 16) by a channel (e.g., a fibre channel switch 14, an IP switch for iSCSI and so forth). The host 12 accesses the storage area 16 by sending input/output (IO) transactions such as read commands to read data from the storage array or as write commands to write data to the storage array. When the host 12 sends data to be written to the storage array 16, the storage array generally sends an acknowledgment message to the host that the data was successfully written to the storage array or sends an error message that an error has occurred. When the host 12 sends a request to read data from the storage array 16, the storage array responds by providing the data to the host. In some situations, the data written to the storage array 16 is encrypted by the host 12 or the data read from the storage array is decrypted by the host.

SUMMARY

In one aspect, a method to offload encryption processing in a storage area network (SAN) system includes determining whether a host is performing at a first performance level, offloading encryption processing to a processor if the host is not performing at a first performance level and performing encryption processing at the host if the host is performing at a first performance level.

In another aspect, an apparatus to offload encryption processing in a storage area network (SAN) system includes circuitry configured to determine whether a host is performing at a first performance level, offload encryption processing to a processor if the host is not performing at a first performance level and perform encryption processing at the host if the host is performing at a first performance level.

In a further aspect, an article includes a machine-readable medium that stores executable instructions to offload encryption processing in a storage area network (SAN) system. The instructions cause a machine to determine whether a host is performing at a first performance level, offload encryption processing to a processor if the host is not performing at a first performance level and perform encryption processing at the host if the host is performing at a first performance level.

DETAILED DESCRIPTION

Described herein is an approach to offload encryption processing in a storage area network (SAN). While the description herein shows a single host and a single storage array for simplicity it is to be understood that the SAN may include multiple hosts and storage arrays and that any one (or more than one) of the hosts may offload encryption processing. While the description focuses on encryption processing it is understood that encryption processing includes decrypting data also.

Figure 2:
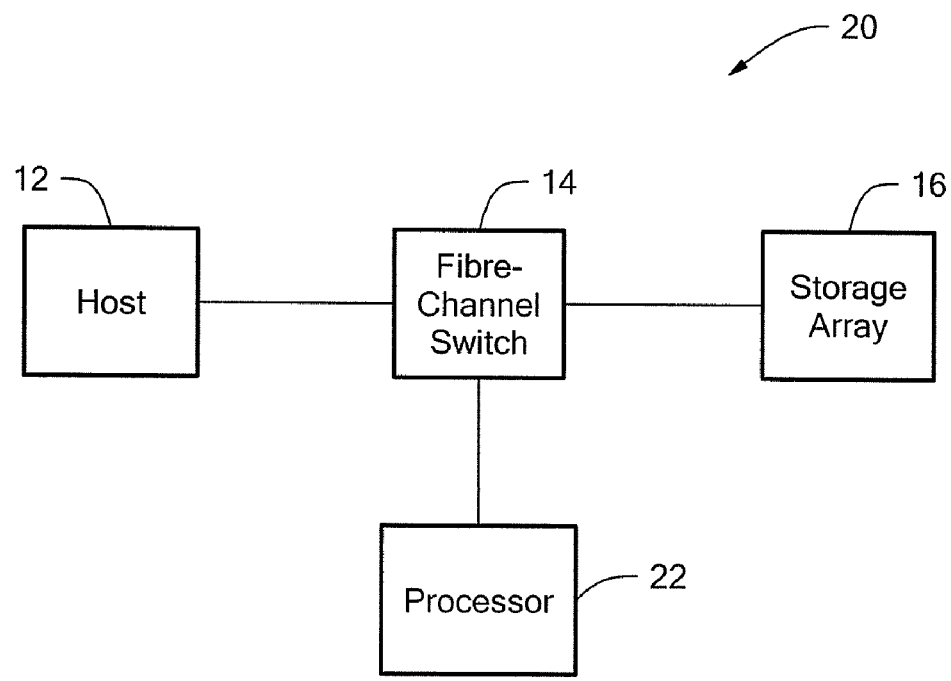
FIG. 2 is a block diagram of an example of a storage-area network used in offloading encryption processing.

Referring to FIG. 2, a storage area network (SAN) 20 is used in offload encryption. The SAN 20 includes a host 12, a storage array 16 coupled together by a fibre channel switch 14 and a processor 22. In one example, the processor 22 forms part of a data protection appliance (e.g., a data protection appliance 510 in FIG. 5) used to duplicate data in the storage array 16. In another example, the encryption processor is a dedicated offload encryption processor used for offload encryption processing. In other examples, the processor 22 may be any other processor in the SAN network including processors at other hosts (not shown).

The host 12 determines whether the host has a minimum processing bandwidth available to perform encryption processing. For example, the host 12 determines a utilization parameter value. If the utilization parameter value is less than a predetermined threshold value for the host 12, the host performs the encryption processing. If the utilization parameter value is greater than a predetermined threshold value for the host 12, the processor 22 performs the encryption processing. In one embodiment, a decision to offload encryption is made for each IO transaction.

In one embodiment, the processor 22 performs the encryption processing until it no longer has the bandwidth processing available to support encryption. For example, the processor 22 has a primary purpose of, for example, duplication processing and encryption processing is a secondary or lesser priority. If the processor 22 determines that a utilization parameter value at the processor 22 is greater than a predetermined threshold value for the processor 22, the processor 22 sends encryption processing back to the host 12. In another embodiment, the processor 22 performs encryption on an IO transaction.

Figure 3A:
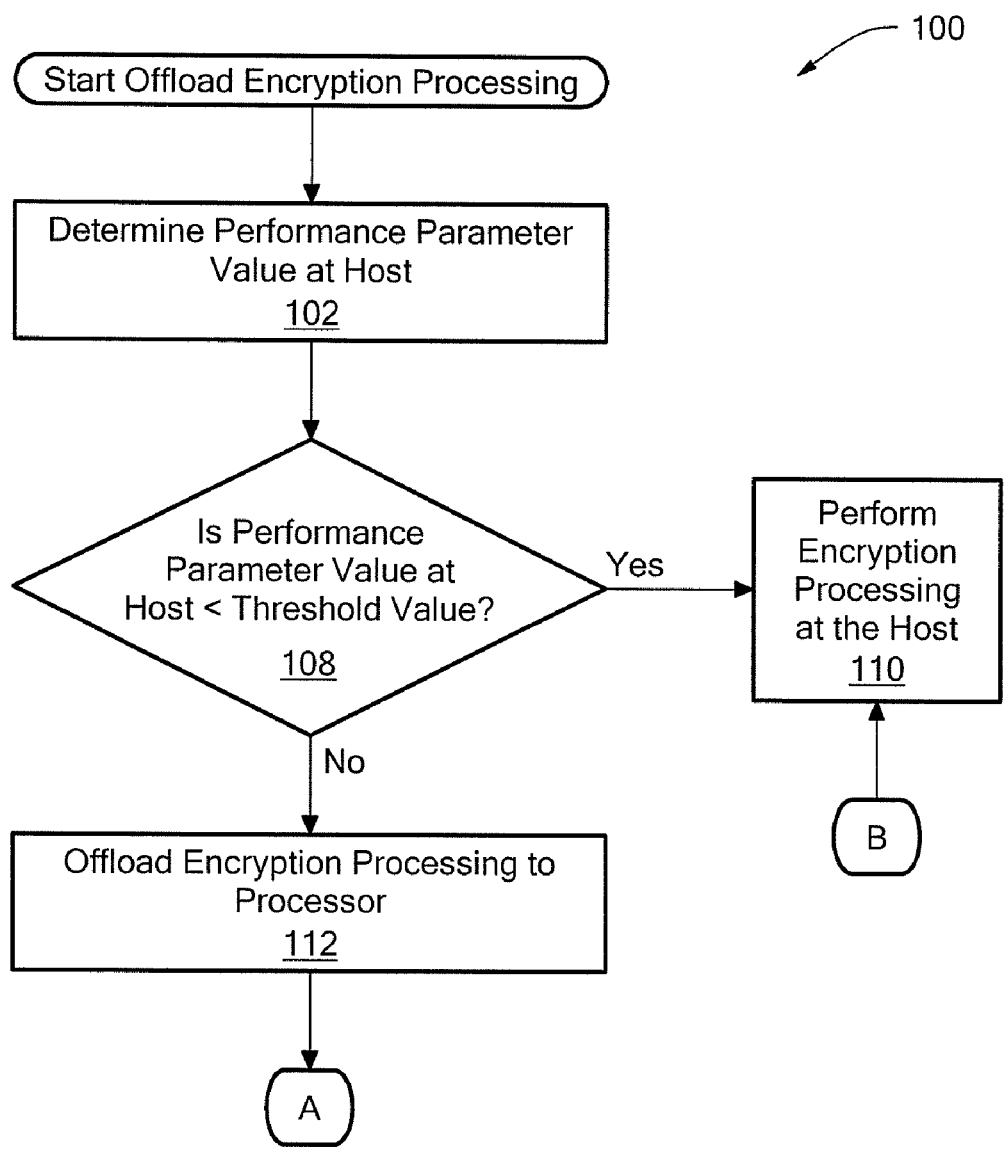
FIG. 3A is a flowchart of a process to offload encryption performed at a host.

FIG. 3A shows offload encryption processing performed at the host 12 using a process 100. The host 12 determines a performance parameter value for the host (102). For example, the performance parameter value for the host 12 is the processor utilization at the host. The host 12 determines whether the performance parameter value for the host is less than a predetermined threshold value (108). For example, the predetermined threshold value is a processor utilization value of 10% at the host 12. If the performance parameter value for the host 12 is less than the predetermined threshold value, the host performs the encryption (110). If the performance parameter value for the host 12 is greater than or equal to the predetermined threshold value, encryption processing is offloaded to the processor 22 (112).

Figure 1:
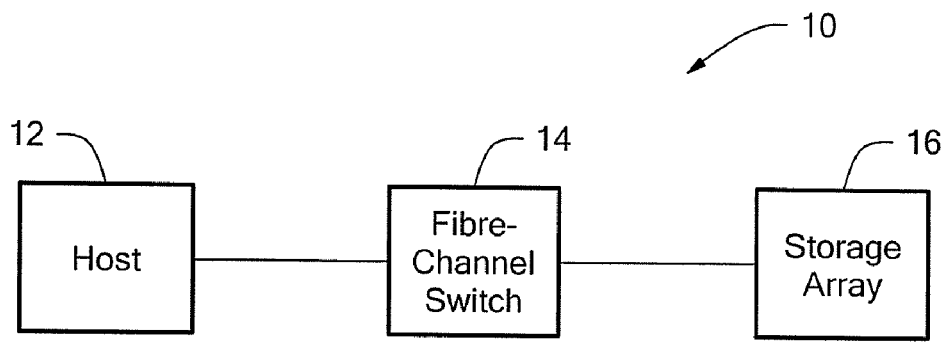
FIG. 1 is a simplified diagram of an example of a prior art storage area network.
Figure 3B:
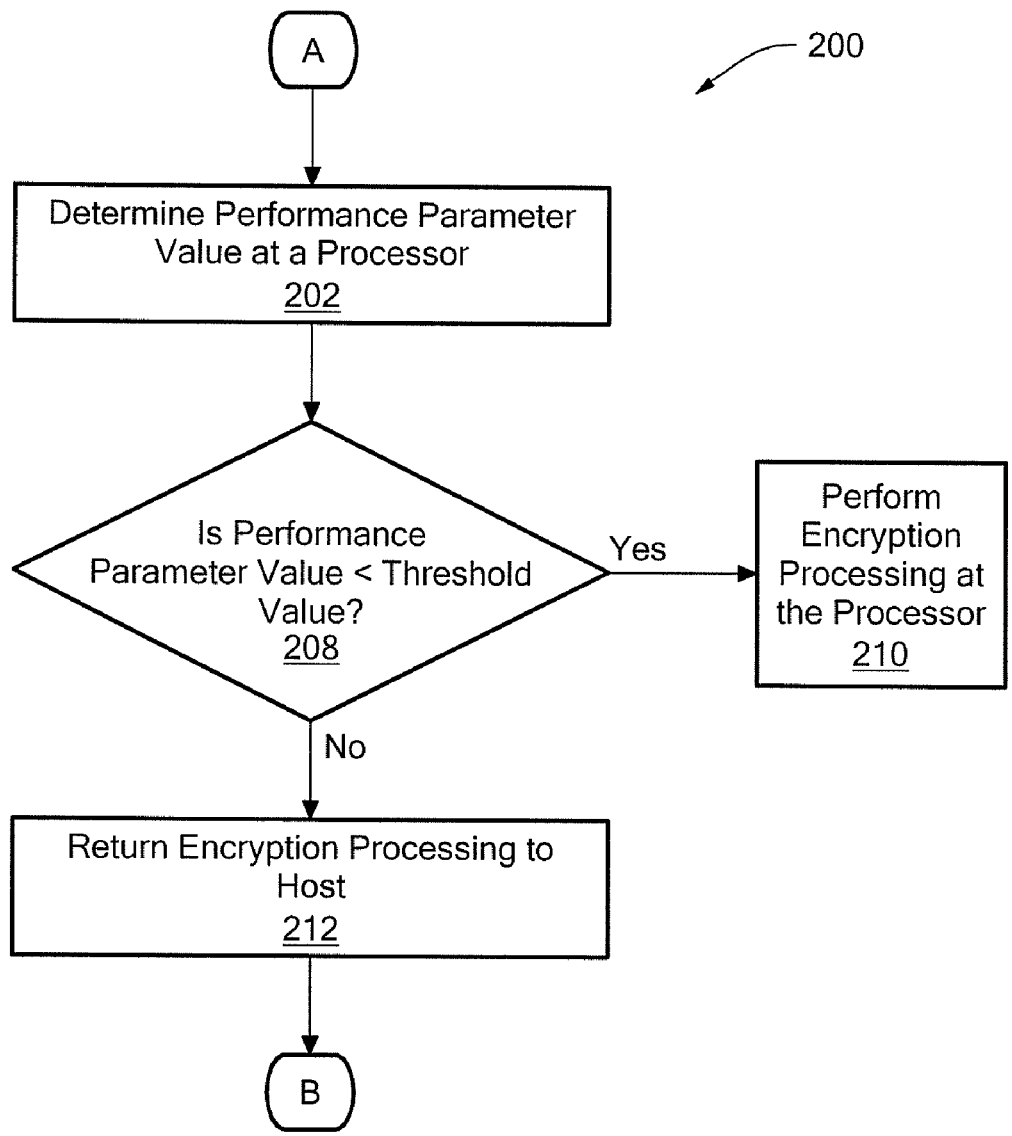
FIG. 3B is a flowchart of a process to offload encryption performed at a processor.
Figure 4A:
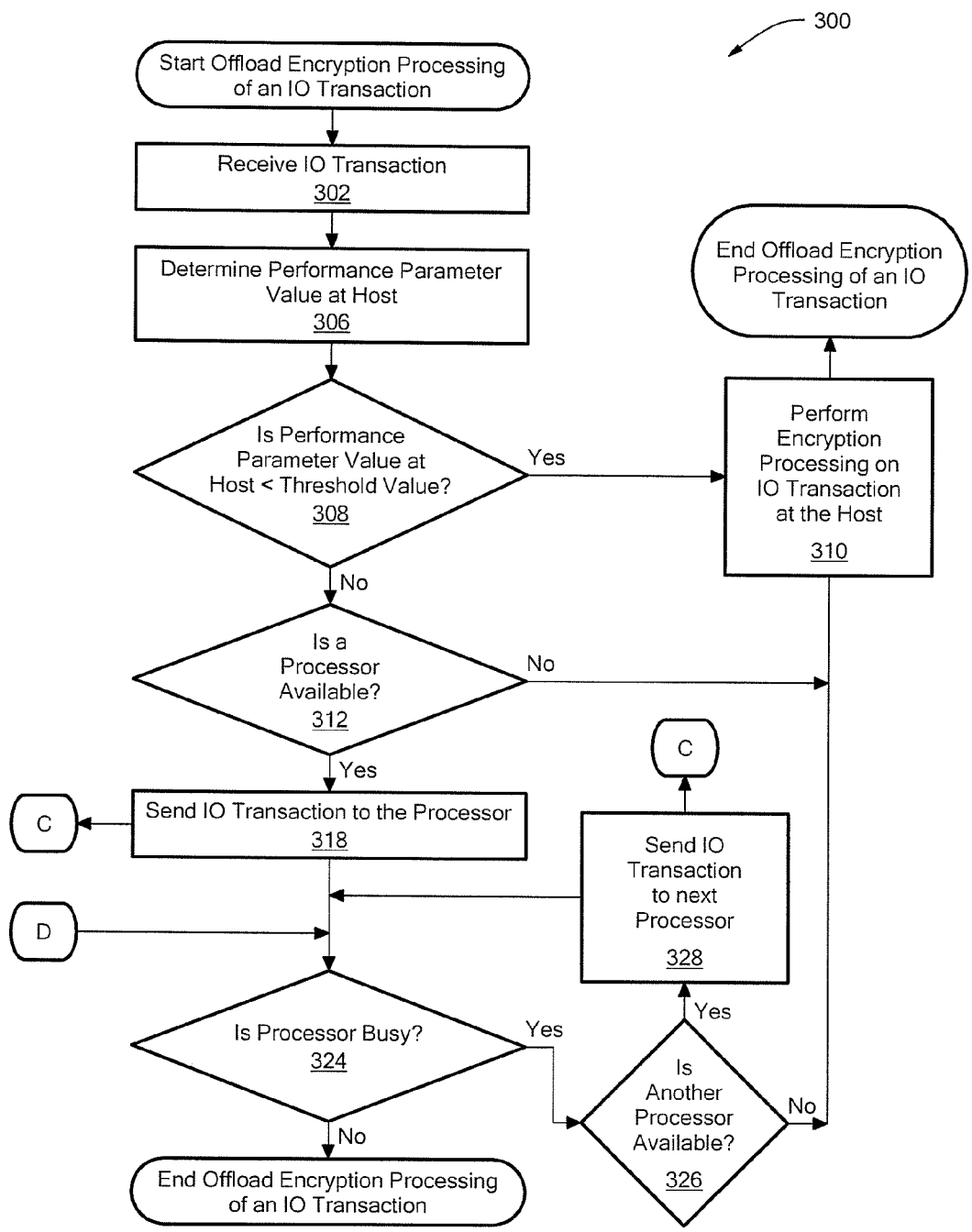
FIG. 4A is a flowchart of a process to offload encryption of an IO transaction performed at a host.
Figure 4B:
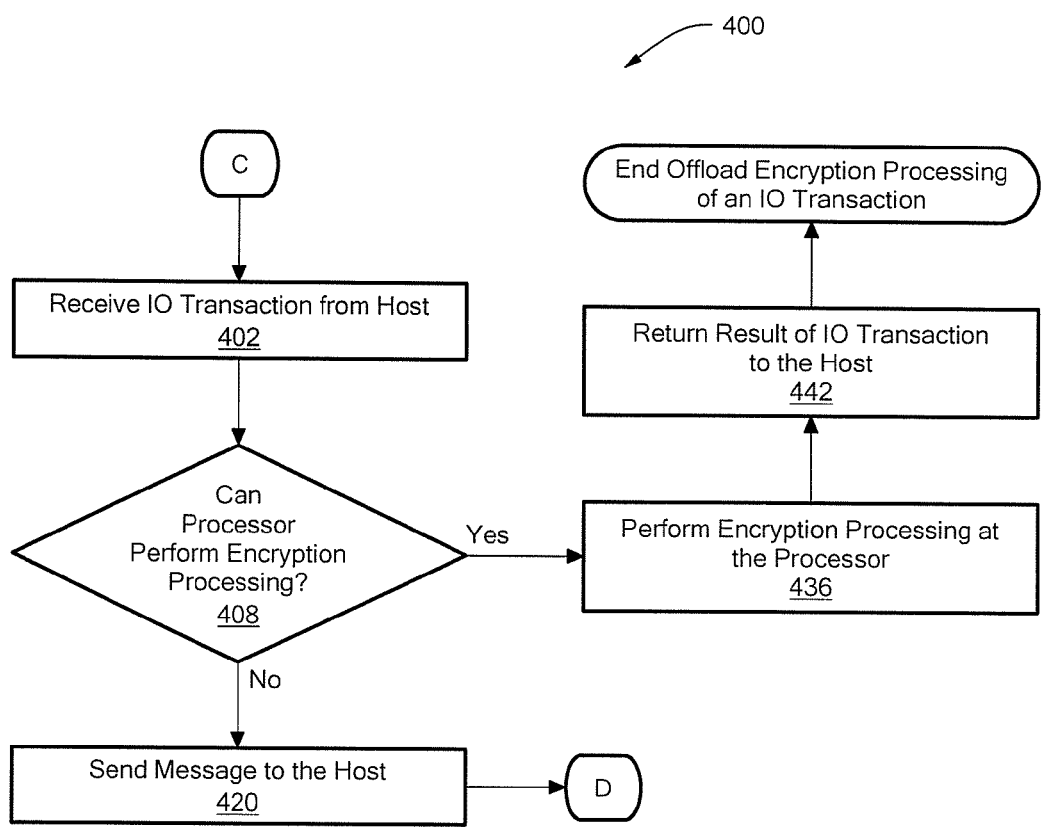
FIG. 4B is a flowchart of a process to offload encryption of an IO transaction performed at a processor.

FIG. 3B shows offload encryption processing performed at the processor 22 using a process 200. The processor 22 determines a performance parameter value for the processor 22 (202). For example, the performance parameter value for the processor 22 is a processor utilization value for the processor 22. The processor 22 determines whether the performance parameter value for the processor is less than a predetermined threshold value for the processor (208). For example, the predetermined threshold value for the processor is a processor utilization value of 95% at the processor 22. If the performance parameter value for the processor 22 is less than the predetermined threshold value for the processor, the processor 22 performs the encryption (210). If the performance parameter value for the processor 22 is greater than or equal to the predetermined threshold value for the processor, encryption processing is returned to the host 12 (212). In another embodiment, encryption processing is returned to the host 12 when the host processor utilization falls below the predetermined threshold at the host In other embodiments, the decision to offload encryption processing may be made for each IO transaction. For example, FIG. 4A show a process 300 performed at the host 12 and FIG. 4B shows a process 400 performed at the processor 22 for each IO transaction. Referring to FIG. 4A, the host 12 receives an IO transaction requiring encryption processing (302). The host 12 determines a performance value at the host (306) and determines if the performance parameter is less than a threshold value (308). If the performance parameter is below the threshold value, the host 12 performs the encryption processing (310). If the performance value is more than the threshold value, the host 12 determines if there is a processor available for encryption processing (312). Even though, one processor, processor 22, is shown in FIG. 1, for simplicity, there can be any number of processors available in the SAN 20 that may be used for offload encryption processing. If no processor is available, the host 12 performs the encryption processing on the IO transaction (310). If a processor is available, the host 12 sends the IO transaction to the processor 22 (318). The host 12 determines if the processor is busy (324). For example, if the processor 22 does not have the capacity it will return a message to the host 12 indicating it is busy (see processing block 420 FIG. 4B). If encryption processing cannot be performed by the processor, the host 12 determines if another processor is available (326) and, if another processor is available, sends the IO transaction to the next processor available (328).

Referring to FIG. 4B, the processor 12 receives a request for encryption processing from the host 12 (402) and determines whether the processor can perform encryption processing (408). If the processor 22 cannot perform the encryption processing, the processor 22 returns a message (e.g., a busy signal) to the host 12 indicating encryption processing cannot be performed (420). If the processor 22 can perform the encryption processing, the processor 22 performs the encryption processing (436) and returns the result of the IO transaction to the host 12 (442). For example, if the IO transaction is an encrypt and write command, the processor 22 encrypts the data and writes the encrypted data to the storage array 16 and the processor 22 returns a write result (e.g., a write success status) to the host 12. If the IO transaction is a read and decrypt command, the processor 22 will read and decrypt the data and return the decrypted data to the host 12.

Figure 5:
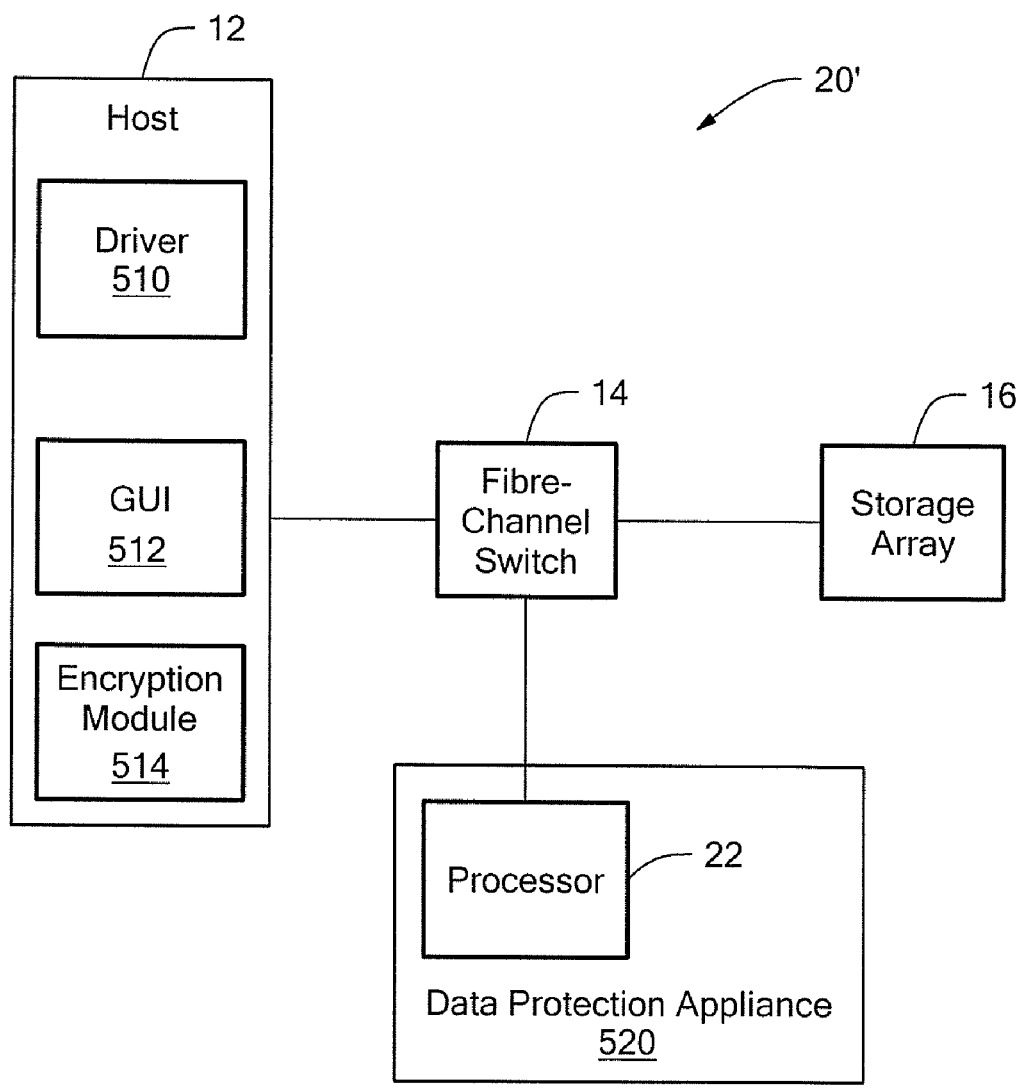
FIG. 5 is a block diagram of another example of a storage-area network used in offloading encryption processing.

Referring to FIG. 5, in one embodiment, a SAN 20' includes the processor 22 and the host 12. The host 12 includes a driver 510, a graphical user interface (GUI) 512 and an encryption module 514. The processor 22 forms part of a data protection appliance 520 used to duplicate data in the storage array 16, for example, a data protection appliance found in patent application Ser. No. 11/536,160, filed on Sep. 28, 2006, assigned to the same assignee as this patent application and is incorporated herein in its entirety.

The driver 510 detects automatically the availability of encryption processors for offloading. In one example, the driver 510 detects the availability of encryption processors, and offloads data arriving to storage arrays selected by a user using the GUI 512. After an IO transaction is detected by the driver 510, the driver checks a performance parameter at the host 12. The driver 510 determines based on the performance parameter whether to redirect the IO transaction to an offload encryption device (e.g., the processor 22) or perform encryption processing at the host 12 using the encryption module 514. If the IO transaction is directed to the processor 22 for encryption processing, the processor 22 performs encryption processing on the data in the IO transaction writes the encrypted data to the storage array and returns an IO transaction status to the host 12. If the host 12 performs the encryption processing, the driver 510 will send the IO transaction to the encryption module 514. For example, the driver 510 receives the IO transactions before the encryption module 514 so that the driver 510 can direct them to the processor 22 for offload encryption processing or direct them to the encryption module 514. If the processor 22 is unavailable, driver 510 can offload encryption processing to another processor (not shown). If all processors designated for offload encryption processing are unavailable, the IO transaction will flow directly to the encryption module 514 and encrypted by the host 12.

Figure 6:
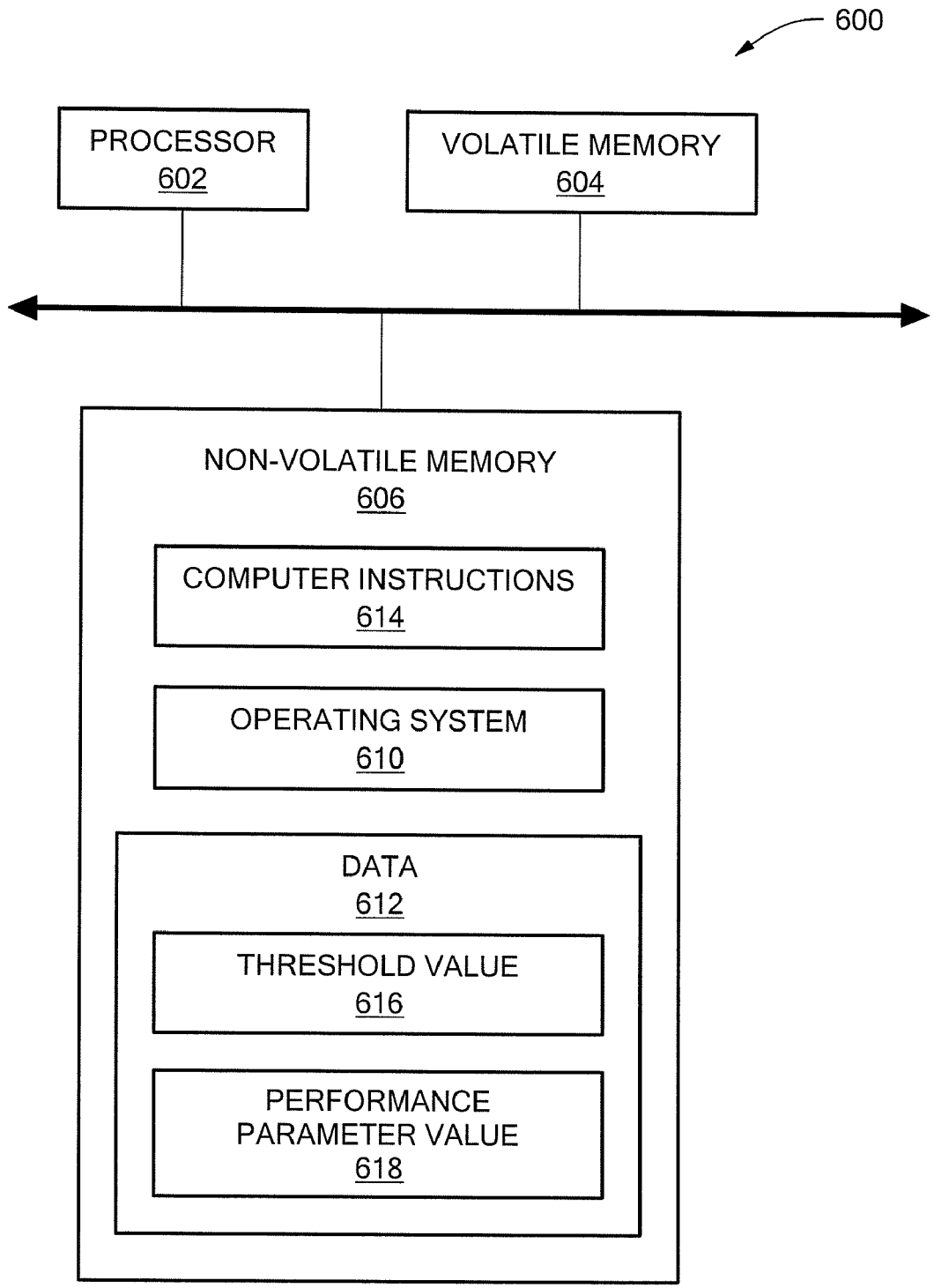
FIG. 6 is a computer on which the processes of FIGS. 3A, 3B, 4A and 4B may be implemented.

FIG. 6 shows a computer 600, which may be used to execute all or part of processes 100, 200, 300 or 400. Computer 600 includes a processor 602, a volatile memory 604 and a non-volatile memory 606 (e.g., hard disk). Non-volatile memory 606 includes an operating system 610, data 612 including a threshold value 31 and a performance value 618, and computer instructions 614 which are executed out of volatile memory 604 to perform processes 100, 200, 300 or 400 or portions of processes 100, 200, 300 or 400.

The processes described herein (e.g., processes 100, 200, 300 and 400) are not limited to use with the hardware and software of FIG. 6; it may find applicability in any computing or processing environment and with any type of machine or set of machines that is capable of running a computer program. The processes may be implemented in hardware, software, or a combination of the two. The processes may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform the processes and to generate output information.

The system may be implemented, at least in part, via a computer program product, (e.g., in a machine-readable storage device, for execution by, or to control the operation of, data processing apparatus (e.g., a programmable processor, a computer, or multiple computers)). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer to perform the processes (e.g., process 100, 200, 300 or 300). The processes may also be implemented as a machine-readable storage medium, configured with a computer program, where upon execution, instructions in the computer program cause the computer to operate in accordance with the processes.

The processes described herein are not limited to the specific embodiments described herein. For example, the processes 100, 200, 300 and 400 are not limited to the specific processing order of the processing blocks in FIGS. 3A, 3B, 4A and 4B. Rather, any of the processing blocks of FIGS. 3A, 3B, 4A and 4B may be re-ordered, combined or removed, performed in parallel or in serial, as necessary, to achieve the results set forth above.

The system described herein is not limited to use with the hardware and software described above. The system may be implemented in digital electronic circuitry, or in computer hardware, firmware, software, or in combinations thereof.

Processing blocks in FIGS. 3A, 3B, 4A and 4B may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit)).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer include a processor for executing instructions and one or more memory devices for storing instructions and data.

Elements of different embodiments described herein may be combined to form other embodiments not specifically set forth above. Other embodiments not specifically described herein are also within the scope of the following claims.

What is claimed is:

1. A method to offload encryption processing in a storage area network (SAN) system, comprising:
   receiving an I/O transaction for encryption processing at a host in the SAN system;
   determining if the host has a bandwidth level to perform the encryption processing on the I/O transaction by comparing a first processor utilization value at the host with a first threshold value;
   performing the encryption processing of the I/O transaction at the host responsive to the host having the bandwidth level to perform the encryption processing;
   offloading the encryption processing of the I/O transaction to a processor if the host does not have a bandwidth level to perform the encryption processing if the first processor utilization value is greater than the first threshold value;
   determining if the processor has a bandwidth level to perform the encryption processing on the I/O transaction by comparing a second processor utilization value at the processor with a second threshold value;
   performing the encryption processing of the I/O transaction at the processor responsive to the processor having the bandwidth level to perform the encryption processing if the second processor utilization value is less than the second threshold value; and
   performing encryption processing of the I/O transaction at the host if the processor does not have a bandwidth level to perform the encryption processing.

2. The method of claim 1 wherein performing encryption processing of the I/O transaction at the host if the host has a bandwidth level to perform encryption comprises performing encryption processing of the I/O transaction at the host if the first processor utilization value is less than the first threshold value.

3. The method of claim 1 wherein performing encryption processing of the I/O transaction at the host if the processor does not have a bandwidth level to perform encryption comprises performing encryption processing of the I/O transaction at the host if the second processor utilization value is greater than the second threshold value.

4. The method of claim 1, further comprising:
   determining if the processor is available; and
   performing encryption processing at the host if the processor is unavailable.

5. The method of claim 1 wherein determining if the processor has a bandwidth level to perform the encryption processing on the I/O transaction by comparing a second processor utilization value with a second threshold value comprises comparing a second processor utilization value at a processor in a data protection appliance with a second threshold value.

6. The method of claim 1 wherein determining if the processor has a bandwidth level to perform the encryption processing on the I/O transaction by comparing a second processor utilization value with a second threshold value comprises comparing a second processor utilization value at a processor at a second host with a second threshold value.

7. A system to offload encryption processing in a storage area network (SAN) system, comprising:
   a host in the SAN, the host being configured to:
      receive an I/O transaction for encryption processing at a host in the SAN system;
      determine if the host has a bandwidth level to perform the encryption processing on the I/O transaction by comparing a first processor utilization value at the host with a first threshold value;
      perform the encryption processing of the I/O transaction at the host responsive to the host having the bandwidth level to perform the encryption processing;
      offload the encryption processing of the I/O transaction to a processor if the host does not have a bandwidth level to perform the encryption processing if the first processor utilization value is greater than the first threshold value;
   a data protection appliance comprising the processor and configured to:
      determine if the processor has a bandwidth level to perform the encryption processing on the I/O transaction by comparing a second processor utilization value at the processor with a second threshold value;
      perform the encryption processing of the I/O transaction at the processor responsive to the processor having the bandwidth level to perform the encryption processing if the second processor utilization value is less than the second threshold value; and
      perform encryption processing of the I/O transaction at the host if the processor does not have a bandwidth level to perform the encryption processing; and
   a fibre switch coupling the host and the data protection appliance.

8. The system of claim 7 wherein the host being configured to perform encryption processing of the I/O transaction at the host if the host has a bandwidth level to perform encryption comprises performing encryption processing of the I/O transaction at the host if the first processor utilization value is less than the first threshold value.

9. The system of claim 7 wherein performing encryption processing of the I/O transaction at the host if the processor does not have a bandwidth level to perform encryption comprises performing encryption processing of the I/O transaction at the host if the second processor utilization value is more than the second threshold value.

10. The system of claim 7 wherein the host is further configured to:
   determine if the processor is available; and
   perform encryption processing at the host if the processor is unavailable.

11. An article comprising:
   a non-transitory machine-readable medium that stores executable instructions to offload encryption processing in a storage area network (SAN) system, the instructions causing a machine to:
      receive an I/O transaction for encryption processing at a host in the SAN system;
      determine if the host has a bandwidth level to perform the encryption processing on the I/O transaction by comparing a first processor utilization value at the host with a first threshold value;
      perform the encryption processing of the I/O transaction at the host responsive to the host having the bandwidth level to perform the encryption processing;
      offload the encryption processing of the I/O transaction to a processor if the host does not have a bandwidth level to perform the encryption processing if the first processor utilization value is greater than the first threshold value;
      determine if the processor has a bandwidth level to perform the encryption processing on the I/O transaction by comparing a second processor utilization value at the processor with a second threshold value;
      perform the encryption processing of the I/O transaction at the processor responsive to the processor having the bandwidth level to perform the encryption processing if the second processor utilization value is less than the second threshold value; and
      perform encryption processing of the I/O transaction at the host if the processor does not have a bandwidth level to perform the encryption processing.

12. The article of claim 11 wherein the instructions to offload encryption processing of the I/O transaction to a processor if the host does not have a bandwidth level to perform encryption comprises instructions to offload encryption processing of the I/O transaction to a processor if the first processor utilization value is greater than the first threshold value.

13. The article of claim 11 wherein the instructions to perform encryption processing of the I/O transaction at the host if the processor does not have a bandwidth level to perform encryption comprises instructions to perform encryption processing of the I/O transaction at the host if the second processor utilization value is more than the second threshold value.

14. The article of claim 11, further comprising instructions to:
   determine if the processor is available; and
   perform encryption processing at the host if the processor is unavailable.

15. The article of claim 11 wherein the instructions causing the machine to determine if the processor has a bandwidth level to perform the encryption processing on the I/O transaction by comparing a second processor utilization value with a second threshold value comprises instructions causing the machine to compare a second processor utilization value at a processor in a data protection appliance with a second threshold value.

16. The article of claim 11 wherein the instructions causing the machine to determine if the processor has a bandwidth level to perform the encryption processing on the I/O transaction by comparing a second processor utilization value with a second threshold value comprises instructions causing the machine to compare a second processor utilization value at a processor at a second host with a second threshold value.

* * * * *